(12) United States Patent
Hwang

(10) Patent No.: US 6,215,482 B1
(45) Date of Patent: Apr. 10, 2001

(54) MEMORY SWAPPING METHOD IN A WEB VIDEO PHONE

(75) Inventor: Jae-Sik Hwang, Kyonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/132,781

(22) Filed: Aug. 12, 1998

(30) Foreign Application Priority Data

Dec. 29, 1997 (KR) .................................................. 97-76005

(51) Int. Cl.$^7$ ...................................................... G06F 16/00
(52) U.S. Cl. .......................... 345/326; 711/105; 711/100; 711/165; 711/117; 345/330
(58) Field of Search .................................... 345/348–354, 345/146, 329–332, 326, 330; 709/300–310, 108; 711/103, 5, 100, 105, 165, 117

(56) References Cited

U.S. PATENT DOCUMENTS

| | | | |
|---|---|---|---|
| 5,675,375 | * 10/1997 | Riffee | 348/15 |
| 5,682,497 | * 10/1997 | Robinson | 711/103 |
| 5,740,396 | * 4/1998 | Mason | 711/103 |
| 5,742,935 | * 4/1998 | Hazen et al. | 711/103 |
| 5,774,540 | * 6/1998 | Davidson et al. | 345/902 |
| 5,841,855 | * 11/1998 | Davidson et al. | 379/387 |
| 5,859,663 | * 1/1999 | Simon | 348/15 |
| 5,860,083 | * 1/1999 | Sukegawa | 711/103 |
| 5,893,135 | * 4/1999 | Hasbun et al. | 711/103 |
| 5,924,039 | * 7/1999 | Hugenberg et al. | 455/454 |
| 5,936,662 | * 8/1999 | Kim et al. | 348/15 |
| 5,966,723 | * 10/1999 | James et al. | 711/103 |
| 5,970,473 | * 10/1999 | Gerszberg et al. | 705/26 |
| 5,983,330 | * 11/1999 | Miwa et al. | 711/167 |
| 6,011,579 | * 1/2000 | Newlin | 348/15 |

* cited by examiner

Primary Examiner—Raymond J. Bayerl
Assistant Examiner—Thomas J Joseph
(74) Attorney, Agent, or Firm—Sughrue, Mion, Zinn, Macpeak & Seas, PLLC

(57) ABSTRACT

A web video phone swaps applications between a flash memory and a DRAM. The applications are encoded to execution codes by an application unit and stored in the flash memory. Upon power up, the web video phone displays on an LCD thereof a top level menu having a plurality of graphic icons each representing a specific one of the applications, and checks whether a user chooses one of the applications. If the user chooses one of the applications, it is checked whether the DRAM has another application being executed currently. If the DRAM has another application being executed currently, the application being executed currently is uploaded to the flash memory together with the data generated during execution of the application. Subsequently, the chosen application is downloaded from the flash memory to the DRAM and executed.

11 Claims, 3 Drawing Sheets

MEMORY SWAPPING METHOD IN A WEB VIDEO PHONE

BACKGROUND OF THE INVENTION

1. Field of the Invention

The present invention relates to a web video phone, and in particular, to a method for effectively managing a memory in a web video phone.

2. Description of the Related Art

A web video phone is a new concept telephone having a video LCD (Liquid Crystal Display) and a keyboard mounted on the telephone body. The web video phone also includes a separate memory such as a DRAM (Dynamic Random Access Memory) and a flash memory, to run various applications (or application programs) such as a web browser, an E-mail application, and a PIM (Personal Information Management) application as well as a known video phone function. The PIM application manages personal information such as an address book, a telephone directory, a scheduler, and a memorandum.

The flash memory stores the above mentioned applications which are statically linked with OS (Operating System) library functions associated with the operating system. When the web video phone is powered on, all the applications statically linked to the OS library functions are downloaded from the flash memory to the DRAM at the same time, so that the applications may be run in the DRAM.

However, since the applications saved in the flash memory are statically linked with the OS library functions, the applications cannot be separated from one another. As a result, when the web video phone is powered on, all the applications are instantaneously and simultaneously downloaded to the DRAM. Therefore, the web video phone needs a high capacity DRAM.

Moreover, when one of the applications is modified, all the other applications should also be compiled and linked again. Therefore, there is a restriction on partially updating the applications.

SUMMARY OF THE INVENTION

It is therefore an object of the present invention to provide a memory swapping method capable of partially updating the applications, with a low capacity DRAM. The low capacity DRAM permits a currently selected application to be run while maintaining a previously selected and executed program, along with its generated data, in a flash memory. This obviates the need to have a large capacity DRAM to download all applications simultaneously.

To achieve the above object, there is provided a method for swapping applications between a flash memory and a DRAM in a web video phone. The applications are encoded to execution codes by an application unit and stored in the flash memory. Upon power up, the web video phone displays on an LCD thereof a top level menu having a plurality of graphic icons. Each icon represents a specific one of the applications. The web video phone checks whether a user chooses one of the applications. If the user chooses one of the applications, it is checked whether the DRAM has another application being executed currently. If the DRAM has another application being executed currently, the application being executed currently is uploaded to the flash memory together with the data generated during execution of the application. Subsequently, the chosen application is downloaded from the flash memory to the DRAM and executed.

BRIEF DESCRIPTION OF THE DRAWINGS

The objects and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail with reference to the attached drawings. Many specific details described in the specification and accompanying drawings are provided for a comprehensive description of the present invention. However, the present invention can be implemented without the details specified herein, but can also be implemented using alternative arrangements that would be apparent to those skilled in the art. In addition, detailed descriptions of known operations and structures included in the present invention are not included to avoid obscuring the subject matter of the present invention.

Figure 1:
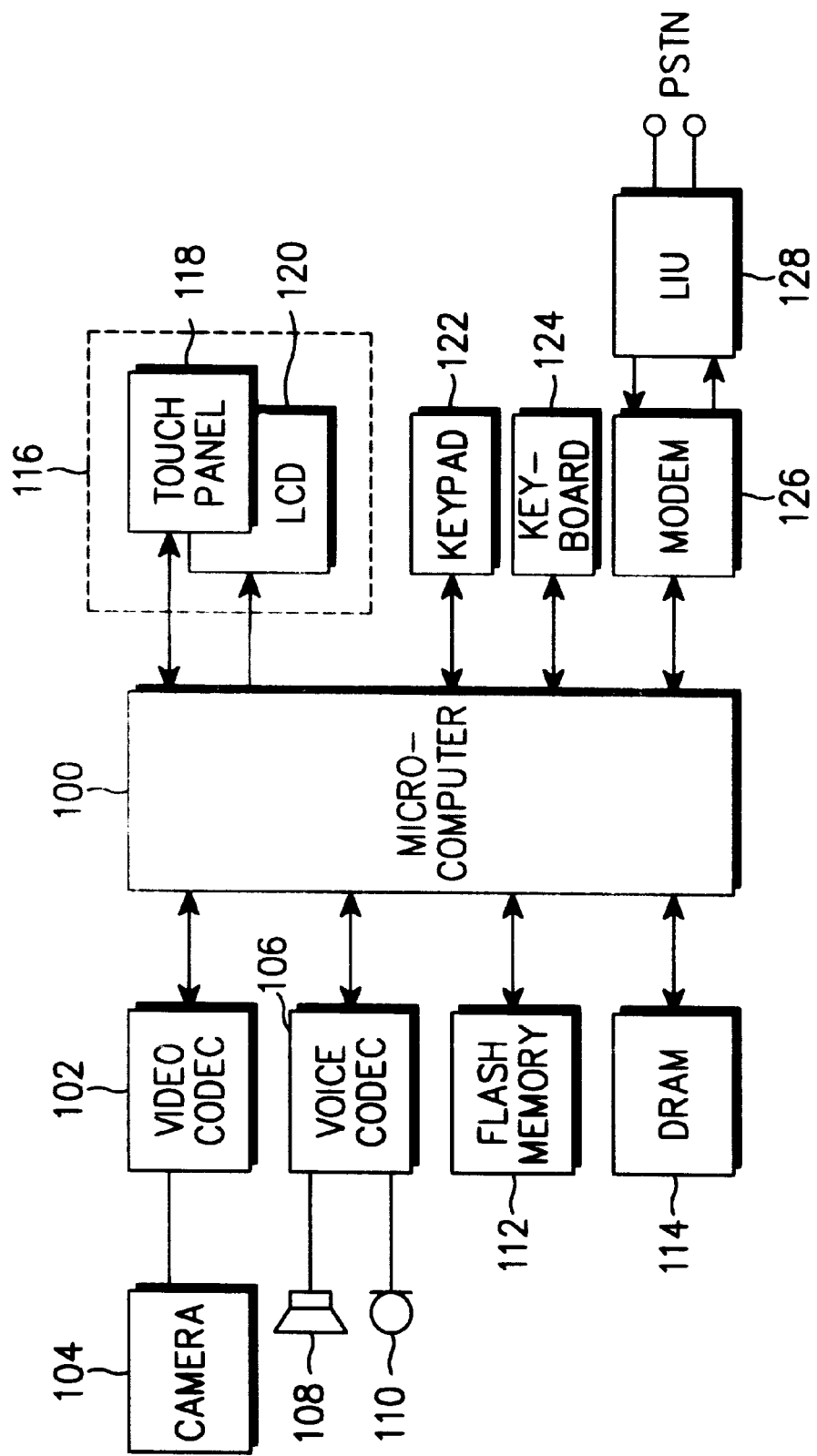
FIG. 1 is a block diagram of a web video phone to which the present invention is applied.

FIG. 1 shows a block diagram of a web video phone to which the present invention is applied. Referring to FIG. 1, a microcomputer 100 controls an overall operation of the web video phone according to a program stored in a flash memory 112. The flash memory 112 stores an operation program of the microcomputer 100 and the various applications supported by the web video phone. The applications are encoded to execution codes by the application unit before being stored into the flash memory 112. A DRAM 114, serving as a main memory, temporarily stores the data generated in the course of executing the various applications. A camera 104 provides an input color video signal to a video CODEC (Coder-Decoder) 102, and the video CODEC 102 converts the color video signal input from the camera 104 into digital video data and compresses the digital video data based on CCITT Recommendation H.261. Further, the video CODEC 102 decodes the compressed video data received from the opposite party via a line interface unit (LIU) 128. A voice CODEC 106 compresses a voice signal input from a microphone 110, and decodes the compressed voice data received from the opposite party via the LIU 128. The LIU 128 connected to a public switched telephone network (PSTN) demultiplexes the compressed voice and video data to provide the voice CODEC 106 and the video CODEC 102 with the voice data and the video data, respectively. A touch screen input/output device 116 consisting of a liquid crystal display (LCD) 120 and a touch panel 118, provides the microcomputer 100 with a screen touch input of the touch panel 118 by the user, and displays on the LCD 120 the various operating status of the web video phone and an operating screen of the applications, under the control of the microcomputer 100. Furthermore, the LCD 120 displays video information according to the video data decoded by the video CODEC 102. A speaker 108 outputs voice data decoded by the voice CODEC 106. A keypad 122 includes a number of dial keys and function keys, and provides the microcomputer 100 with key data according to a key input by the user. A keyboard 124 is a key input means with which the user can choose the applications such as the web browser, E-mail, or PIM applications, and provides the microcomputer 100 with key data generated according the key input by the user. A MODEM (Modulator-Demodulator) 126 modulates the output data of the microcomputer 100 and the video data into analog signals to transmit them to the PSTN via the LIU 128, and demodulates the analog modulation signals received from the PSTN.

Figure 2:
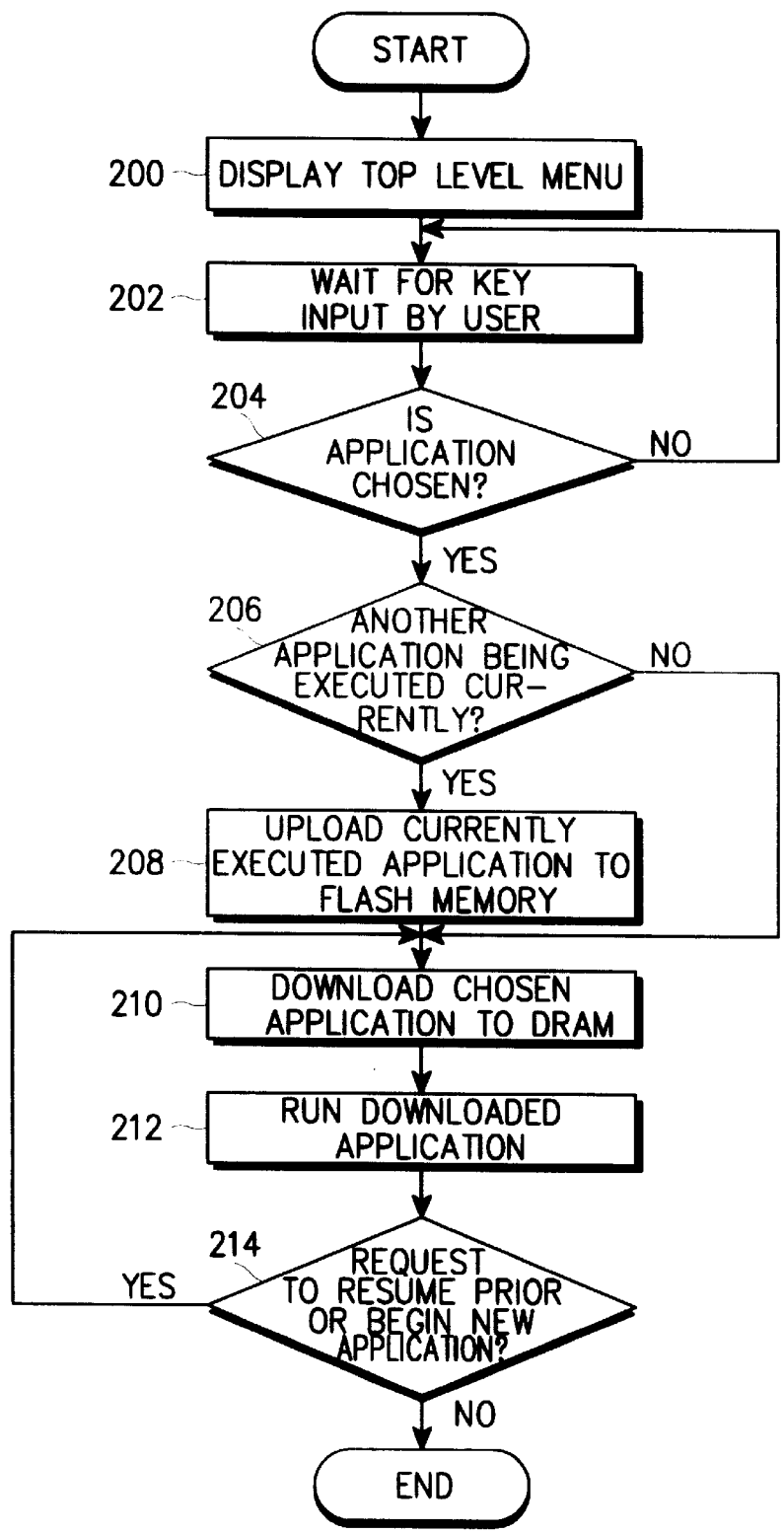
FIG. 2 is a flow chart for swapping applications between a flash memory and a DRAM according to an embodiment of the present invention.

FIG. 2 shows a flow chart for swapping applications between the flash memory 112 and the DRAM 114 according to an embodiment of the present invention. An operation according to the flow chart of FIG. 2 is performed by the microcomputer 100 of FIG. 1. Now, referring to FIGS. 1 and 2, the preferred embodiment of the present invention will be described in detail.

When the web video phone is powered up by the user, the microcomputer 100 displays a top level menu on the LCD 120 at step 200, and then, proceeds to step 202 to wait for the key input by the user. Here, the top level comprises a plurality of graphic icons each representing a specific application. The user can choose a specific icon representing an application that he/she desires to run, by using the keyboard 124 or by touching a key on the touch panel 118 prepared on the touch screen input/output device 116. Then, the microcomputer 100 checks at step 204 whether there is any application chosen by the user. If none of the applications is chosen, the microcomputer 100 returns to the step 202 to wait for the key input or key touch input by the user. On the contrary, however, if there is an application chosen by the user, the microcomputer 100 checks at step 206 whether there is any other prior application which is being executed currently in the DRAM 114. If the DRAM 114 has another prior application that is being executed currently, the microcomputer 100 uploads at step 208 the currently executed application and the data generated during execution of this application to an application storage area and a data storage area in the flash memory 112, respectively. After that, the procedure goes to step 210.

However, if the DRAM 114 does not have another prior application being executed currently, the microcomputer 100 jumps to the step 210 to download the application chosen by the user at the step 204 from the flash memory 112 to the DRAM 114, and then, runs the downloaded application at step 212.

At step 214, it is determined whether the user wishes to run a different application program than the program currently being executed in the DRAM. If not, the memory swapping process ends. If it is determined that the user wishes to resume a prior application, or start a new application, the processing returns to step 208 to upload the current application program executing in the DRAM and to download the selected application.

Figure 3:
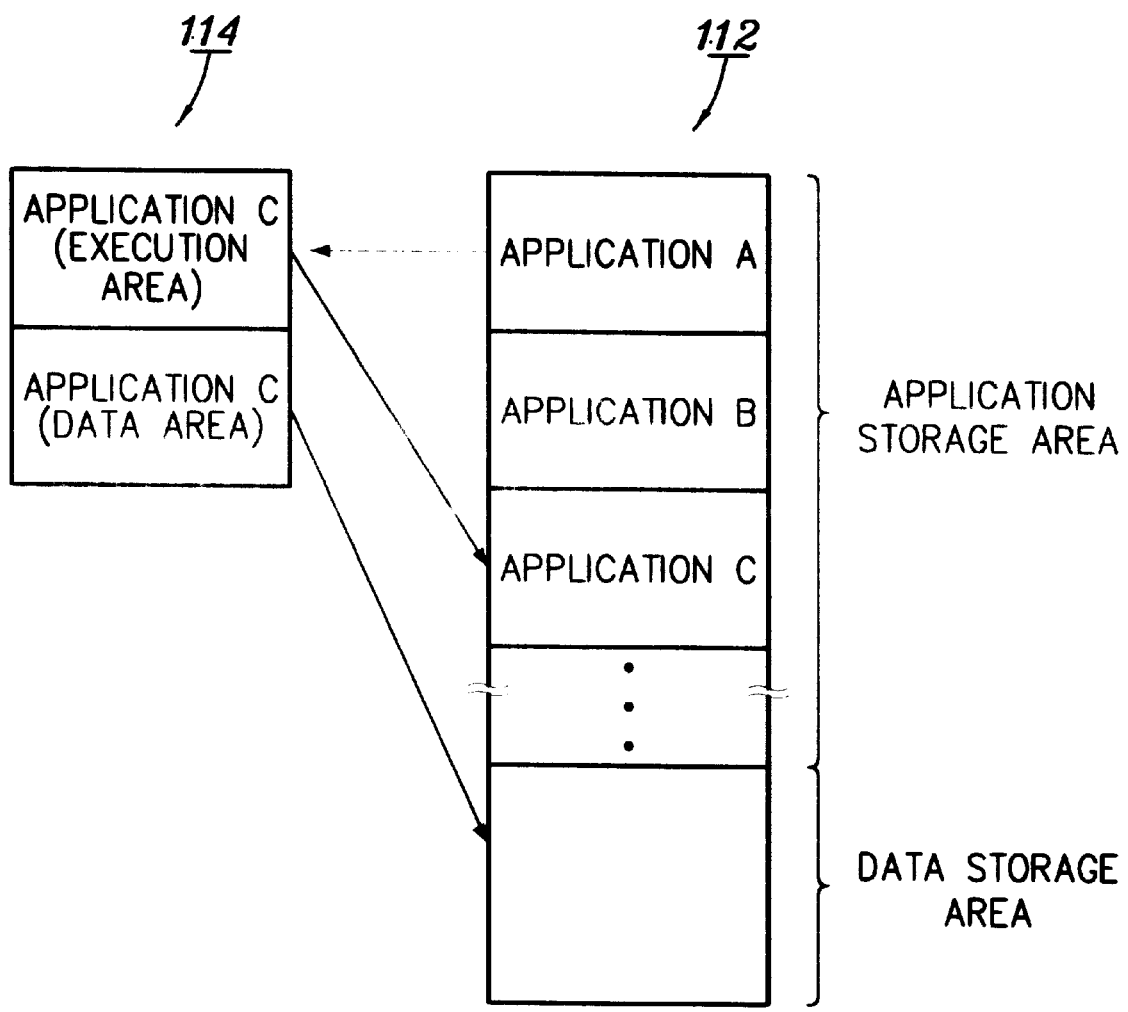
FIG. 3 is a diagram illustrating a memory map of the flash memory and the DRAM according to an embodiment of the present invention.

FIG. 3 is an exemplary diagram for specifically explaining how the applications and the data are swapped between the flash memory 112 and the DRAM 114. Referring to FIG. 3, in case an application A in the flash memory 112 is chosen by the user while an application C is currently being executed in the RAM 114, the currently executed application C in the DRAM 114 is uploaded to the application storage area for the application C in the flash memory 112 and the data generated during execution of this application C is also uploaded to the data storage area in the flash memory 112. Subsequently, the selected application A is downloaded from the flash memory 112 to the DRAM 114 and executed.

In view of the foregoing, the applications in the top level menu are encoded to the execution codes by the application unit and stored in the flash memory 112. If the user chooses a first application, the chosen application stored in the flash memory 112 is downloaded to the DRAM 114 and executed. If during execution of this first application program, the user chooses another application, the currently executed application is uploaded to the flash memory 112 together with the data generated during execution of the application. Thus, if the user chooses this first application later, the application will resume from the portion where execution of the first application was halted. This is achieved by swapping the program for application C, along with its generated data, into the DRAM. Meanwhile, the program and data for executing application A is placed in the flash memory. Further, since the applications are encoded to the execution codes by the application unit, it is possible to partially update the applications by the application unit.

As described above, the applications are encoded to the execution codes by the application unit, stored in the flash memory, and partially downloaded to the DRAM when chosen. Therefore, the web video phone of the invention can works even with a low capacity DRAM. In addition, it is possible to partially update the applications by the application unit.

While the present invention has been described in detail with reference to the specific embodiment, it is clearly understood that many variations can be made by anyone skilled in the art within the scope and spirit of the present invention. Thus, the appropriate scope hereof is deemed to be in accordance with the claims as set forth below.

What is claimed is:

1. A method for swapping applications between a flash memory and a main memory in a web video phone, said applications being encoded to execution codes by an application unit and stored in said flash memory, said method comprising the steps of:

upon power up of the phone, displaying on a display of said web video phone a top level menu having a plurality of graphic icons each representing a respective one of said applications, and checking whether a user chooses one of said applications as a current application;

when the user chooses one of said applications as said current application, checking whether said main memory has a prior application being executed;

if said main memory has said prior application being executed, uploading said prior application being executed to said flash memory together with the data generated during execution of said prior application; and downloading said chosen current application from said flash memory to the main memory to execute said current application.

2. The method as claimed in claim 1, wherein said main memory is a dynamic random access memory.

3. The method as claimed in claim 2, wherein said prior application being executed is uploaded to an application storage area in the flash memory and the data generated during execution of said prior application is uploaded to a data storage area in the flash memory.

4. The method as claimed in claim 1, further comprising:

determining whether the user has selected to resume said prior application when said current application is being executed, and when it is determined that the user has selected to resume said prior application, uploading said current application to said flash memory together with data generated during execution of said current application and downloading said prior application from said flash memory to said main memory to resume execution of said prior application.

5. A method for swapping applications between a flash memory and a main memory in a web video phone, said applications being encoded to execution codes by an application unit and stored in said flash memory, said method comprising the steps of:

receiving input which indicates an application which is to be executed;

determining whether an application other than said indicated application is currently being executed; and downloading said indicated application to said main memory, wherein if it is determined in said determining step that an application other than said indicated application is currently being executed, then said application currently being executed is uploaded to said flash memory before said indicated application is downloaded to said main memory.

6. The method of claim 5, wherein said main memory is a dynamic random access memory.

7. The method of claim 6, wherein said application currently being executed is uploaded to an application storage area in said flash memory and the data generated during execution of said application is uploaded to a data storage area in said flash memory.

8. A method for swapping applications between a flash memory and a main memory in a web video phone, said method comprising the steps of:

receiving input which indicates an application which is to be executed;

determining whether an application other than said indicated application is currently being executed;

downloading said indicated application to said main memory, wherein if it is determined in said determining step that an application other than the indicated application is currently being executed, then said application currently being executed is uploaded to said flash memory before said indicated application is downloaded to said main memory, and wherein said applications are encoded to execution codes and stored in said flash memory.

9. The method of claim 8, wherein said main memory is a dynamic random access memory.

10. The method of claim 9, wherein said application currently being executed is uploaded to an application storage area in said flash memory and the data generated during execution of said application is uploaded to a data storage area in said flash memory.

11. The method of claim 8, wherein said encoding step is performed by an application unit.

* * * * *